(12) United States Patent
Nagasaka et al.

(10) Patent No.: US 6,574,428 B2
(45) Date of Patent: Jun. 3, 2003

(54) PACKAGING METHOD OF LENS-FITTED PHOTO FILM UNIT AND PACKAGING COVER THEREFORE

(75) Inventors: Toshihide Nagasaka, Kanagawa (JP); Shuichi Ichino, Kanagawa (JP); Hideo Tomizawa, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/012,554

(22) Filed: Dec. 12, 2001

(65) Prior Publication Data
US 2002/0071667 A1 Jun. 13, 2002

(30) Foreign Application Priority Data
Dec. 12, 2000 (JP) ......................... 2000-377533

(51) Int. Cl.$^7$ ................ G03B 17/02; B65B 53/02; B65D 85/38; B65D 17/00
(52) U.S. Cl. ............... 396/6; 396/535; 53/442; 206/316.2; 229/207; 229/242
(58) Field of Search .................. 396/6, 535; 53/442, 53/441, 233; 206/316.2, 316.1, 578; 29/407.1; 229/207, 242; 383/210, 211

(56) References Cited
U.S. PATENT DOCUMENTS
5,350,062 A * 9/1994 Takiguchi et al. ....... 206/316.2
* cited by examiner Primary Examiner—David M. Gray
Assistant Examiner—Rochelle Blackman
(74) Attorney, Agent, or Firm—Young & Thompson

(57) ABSTRACT

A package cover for packaging a lens-fitted photo film unit includes two side sheets covering two side faces of the lens-fitted photo film unit and an outer sheet covering front, rear, top and bottom faces thereof. The outer sheet is provided with edge portions formed of a plastic sheet which has heat-shrinkable property. After the side sheets are adhered to the lens-fitted photo film unit, the outer sheet is wrapped around it. The edge portions are shrunken by blowing a hot air thereon and fixedly stuck to edges of the side sheets.

15 Claims, 9 Drawing Sheets

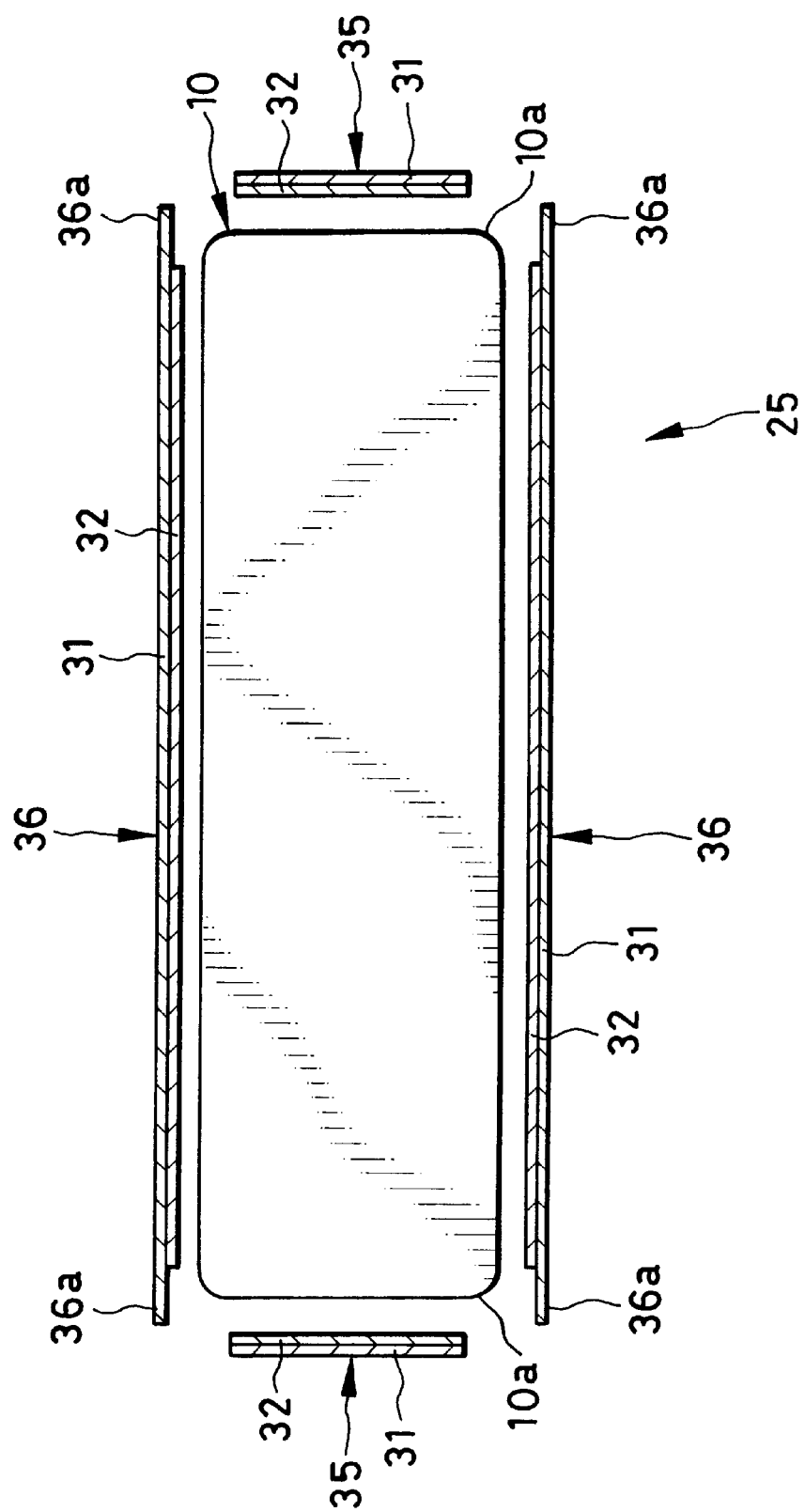

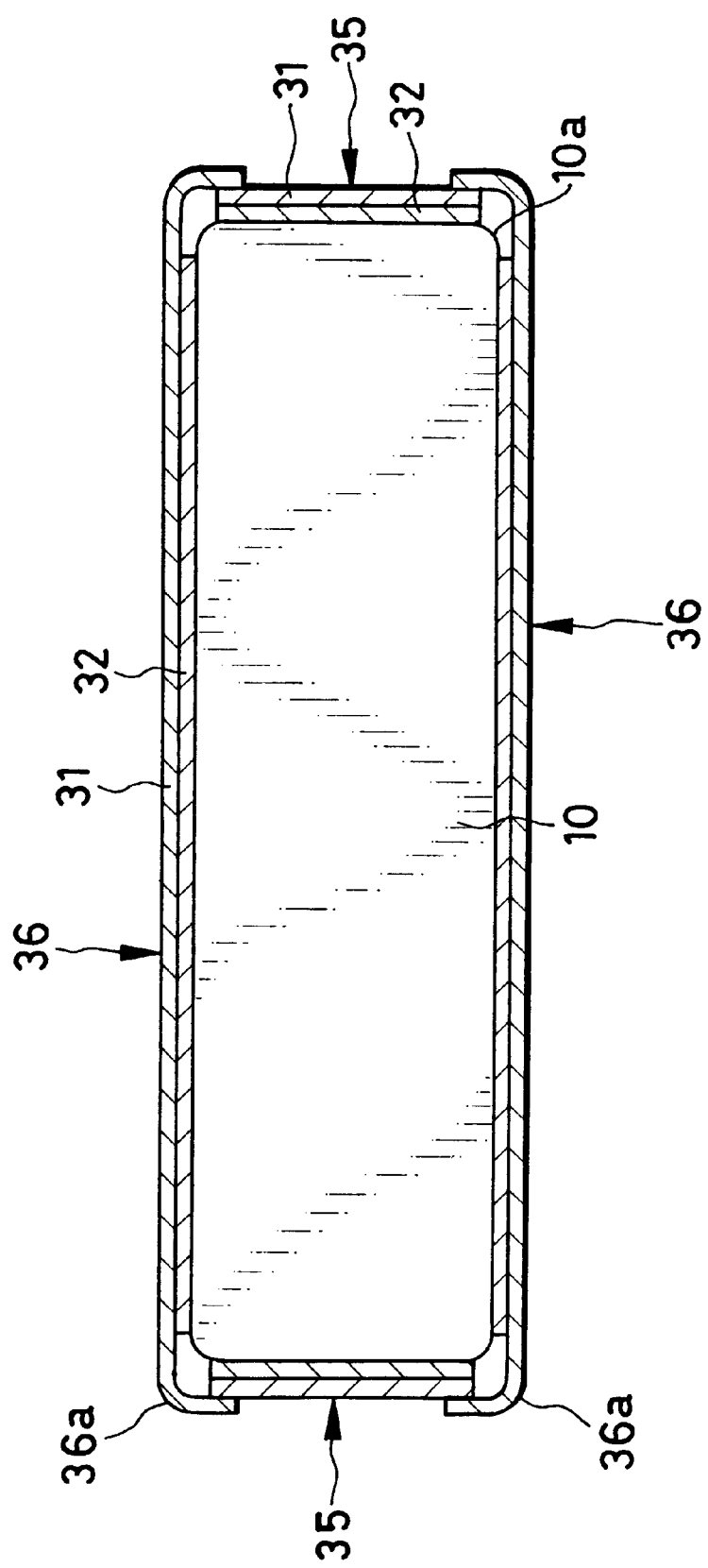

PACKAGING METHOD OF LENS-FITTED PHOTO FILM UNIT AND PACKAGING COVER THEREFORE

BACKGROUND OF THE INVENTION

1. Field of the Invention

The present invention relates to a packaging method of a lens-fitted photo film unit and a package cover therefore.

2. Description Related to the Prior Art

A lens-fitted photo film unit (hereafter film unit) are produced and sold by Fuji Photo Film Co., Ltd. In the film unit, a photo film is previously loaded. The film unit is provided with photographic elements such as taking lens and a flash emitting portion. A surface of the film unit is covered with an outer case having openings from which photographic elements appear. In order to protect the photo film in the film unit from moisture and dusts, the film unit sold in the market is wrapped in a rectangular tube-shaped gusset bag made of a composite sheet, which has an aluminum sheet as a base whose both surfaces are laminated of a plastic sheet.

As the gusset bag is thin, there are some problems, for example, weakness against impact. Therefore, a spacer sheet which is made of paper and has a channel shape is disposed between the film unit and the gusset bag so as to face on a front face of the film unit.

However, in the structure above described, the number of parts for packaging the film unit becomes larger, and at least three processes, namely, setting the spacer sheet, inserting in the gusset bag, adhering to close the gusset bag, and the like are necessary to package the film unit, which are cause of increasing the cost for packaging. Further, the gusset bag and the spacer sheet are further dumped as a trash after tore off, and it is not preferable in view of environmental protection.

SUMMARY OF THE INVENTION

A main object of the present invention is to provide a package cover for and a method of packaging a film unit at a low cost without loosing a moisture-proof property and a beauty of appearance.

Another object of the present invention is to provide a package cover for and a method of packaging a film unit, in which the number of parts for packaging becomes smaller.

Still another object of the present invention is to provide a package cover for and a method of packaging a film unit, which reduces the amount of trash when the lens-fitted photo film unit is used.

In order to achieve the objects, a package cover for lens-fitted photo film unit of the present invention is constructed of two side sheets and an outer sheet. The side sheets are made of a sheet material having a moisture-proof property, and adhered to both side faces of the lens-fitted photo film unit. The outer sheet is made of a sheet material having a moisture-proof property and a heat-shrinkable property. In the outer sheet, a removable portion is formed. When a hanger adhered to the removable portion is pulled, the removable portion is removed from the outer sheet, and photographic elements and operation members, for example, a taking lens, a view finder, a flash light projector, a shutter release button, a film winding wheel, and the like appear.

At first, in order to package the film unit, two side sheets are adhered to both side faces of the lens-fitted photo film unit. Then, the outer sheet is wrapped on it to cover front, rear, top and bottom faces thereof, and both ends of the outer sheets are piled. The one of the both ends is provided with an adhesive layer containing an adhesive agent, so as to be connected to the other. Thereafter, the outer sheet is heated by blowing a hot air such that edge portions of the outer sheet, which protrude out of the film unit, may shrink to lie on edges of the side sheet and cover corners of the lens-fitted photo film unit.

According to the package cover of the present invention, as the numbers of parts and processes of packaging are not large, the cost for packaging the film unit can be reduced. Further, only the removable portion became a trash after tore off. Therefore, it is preferable for the environmental protection.

BRIEF DISCRIPTION OF THE DRAWINGS

The above objects and advantages of the present invention will become easily understood by one of ordinary skill in the art when the following detailed description would be read in connection with the accompanying drawings.

FIG. 5A is a sectional view of the package cover of the present invention, which illustrates a positional relation of a side sheet and a package cover to the lens-fitted photo film unit when packaging is carried out;

FIG. 5B is a sectional view of the package cover of the present invention, which illustrates a condition of the side sheet and the outer sheet after packaging;

PREFERRED EMBODIMENTS OF THE INVENTION

Figure 1:
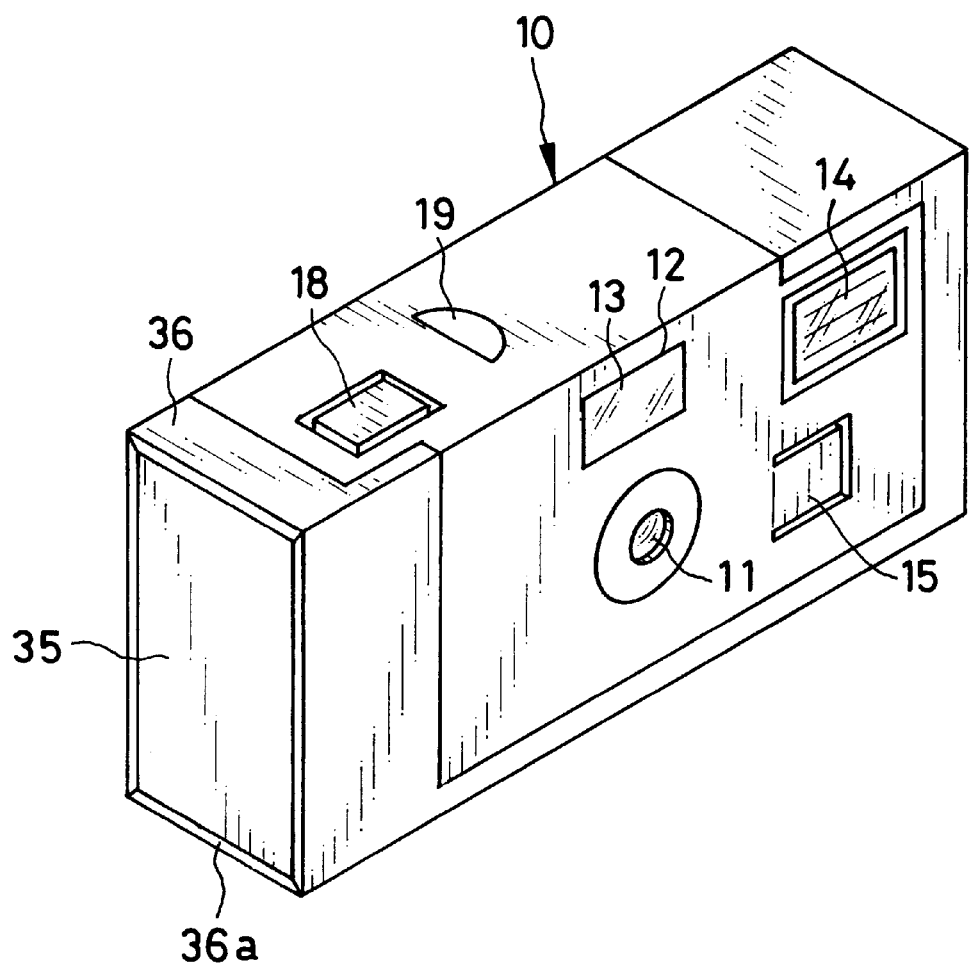
FIG. 1 is a perspective front view of a lens-fitted photo film unit when it is used, in which a removable portion has been already removed from a package cover.
Figure 2:
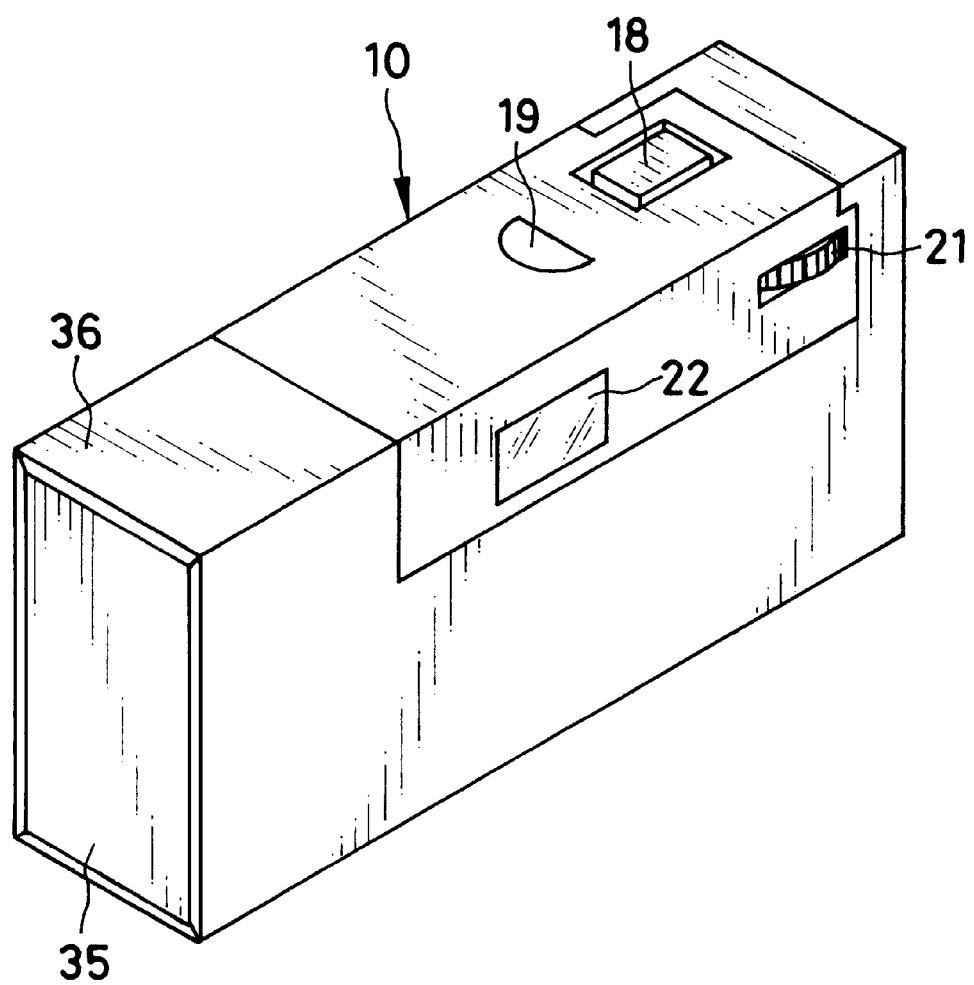
FIG. 2 is a perspective rear view of the lens-fitted photo film unit in FIG. 1.

As shown in FIG. 1, a lens-fitted photo film unit (hereinafter film unit) 10 is provided with a taking lens 11, a finder objective window 13 of a view finder 12, a flash light projector 14, a flash charge switch 15, a shutter release button 18 and a frame counter window 19 for indicating the number of unexposed frames to be photographed. As shown in FIG. 2, a rear face of the film unit 10, a film winder wheel 21 and a finder eyepiece window 22 of the view finder 12 are disposed.

Figure 3:
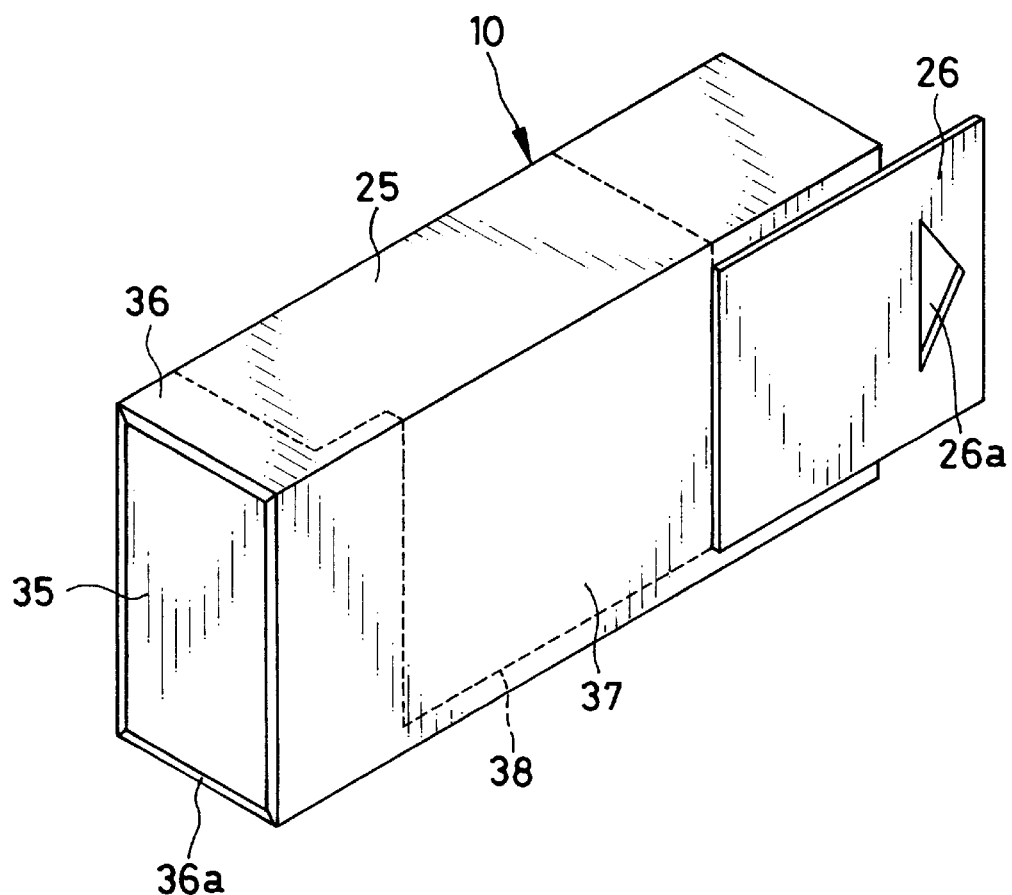
FIG. 3 is a perspective front view of the lens-fitted photo film unit packaged with a package cover, in which a removable portion is removed from a package cover.
Figure 4:
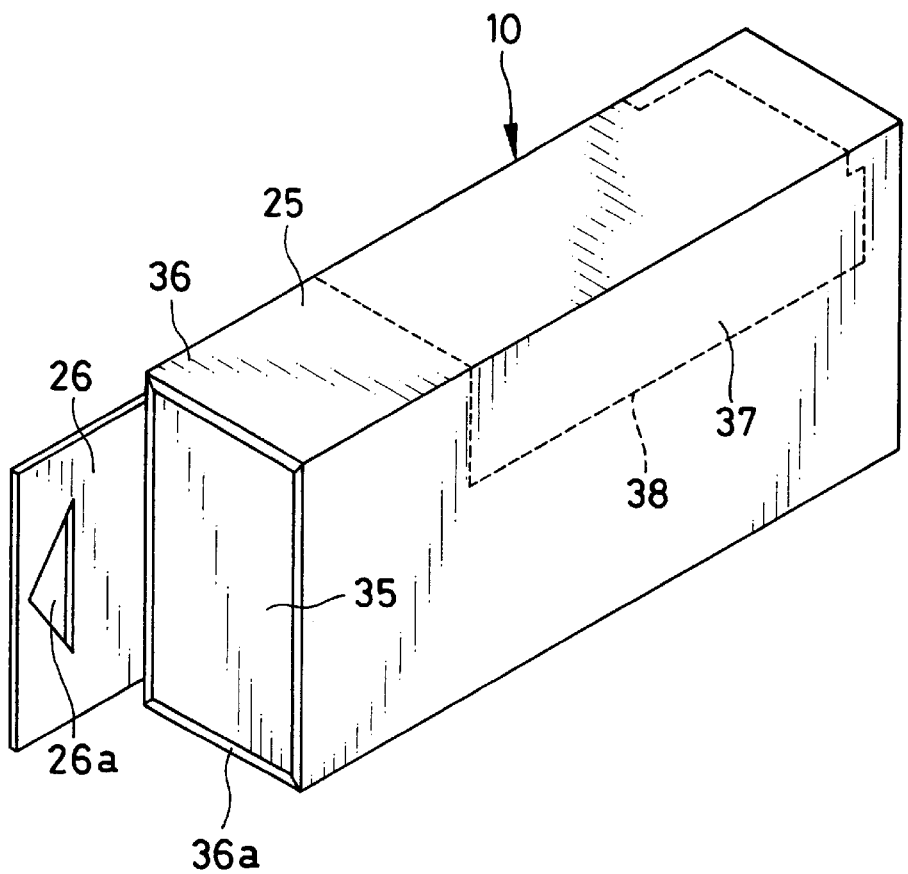
FIG. 4 is a perspective rear view of the lens-fitted photo film unit in FIG. 3.

The film unit 10 sold in the market is packaged with a package cover 25, as shown in FIGS. 3 and 4. The package cover 25 has half cuts 38 for forming a removable portion 37 which is a portion inside the half cuts 38. As the removable portion 37 is removed, photographic elements and operation members appear. The photographic elements include the taking lens 11, the view finder 12, the flashlight projector 14 and the like. The operation members include the flash charge switch 15, a shutter release button 18, the film winder wheel 21 and the like.

As shown in FIG. 5A, the package cover 25 is constructed of two side sheets 35 and an outer sheet 36, and used as an outer cover. The side sheets 35 and the outer sheet 36 made of sheet materials in which a plastic sheet 31 is laminated on an aluminum sheet 32. The plastic sheet 31 has a heat-shrinkable property and the aluminum sheet 32 a moisture-proof property. On a surface of the plastic sheet, pictures and/or letters are printed for decoration, and on an inner surface of the aluminum sheet 32, an adhesive layer (not shown) of a weak adhesive force is formed. A pressure sensitive adhesive or hot melt is applied to form the adhesive layer.

On the removable portion 37, a hanger 26 is fixed with an adhesive of a strong adhesive force. The hanger 26 has an opening 26a in which a hook is inserted such that the film unit 10 may hang to the hook for displaying. On the hanger 26, pictures and/or letters for decoration, an instruction manual, an explanation how to enlist or enter for a prize are printed. The instruction manual and the explanation may be printed on a seal, which is stuck on the hanger 26.

A shape of the side sheets 35 is rectangular and almost same as side faces of the film unit 10. The side sheets cover the side faces. In the embodiment, the film unit 10 is provided with corners 10a on all of four edges of the one side face. Namely, the one corner 10a is disposed at a corner connecting the side face and one of another faces of the film unit 10, such as front, rear, top and bottom faces. The corners 10a have arc-shaped surfaces and are not covered with the side sheets 35.

The outer sheet 36 covers the front, rear, top and bottom faces and the corners 10a. In order to cover the corners 10a, the outer sheet 36 has edge portions 36a at both ends in the lengthwise direction of the film unit 10. The edge portion 36a is formed of the plastic sheet to have the heat shrinkable property, and, as shown in FIG. 5B, has an enough length to cover the corner 10a and the edge of the side sheet 35. The aluminum sheet 32 of the outer sheet 36 has an almost same length as the film unit 10 in the lengthwise direction of the film unit 10.

Figure 6:
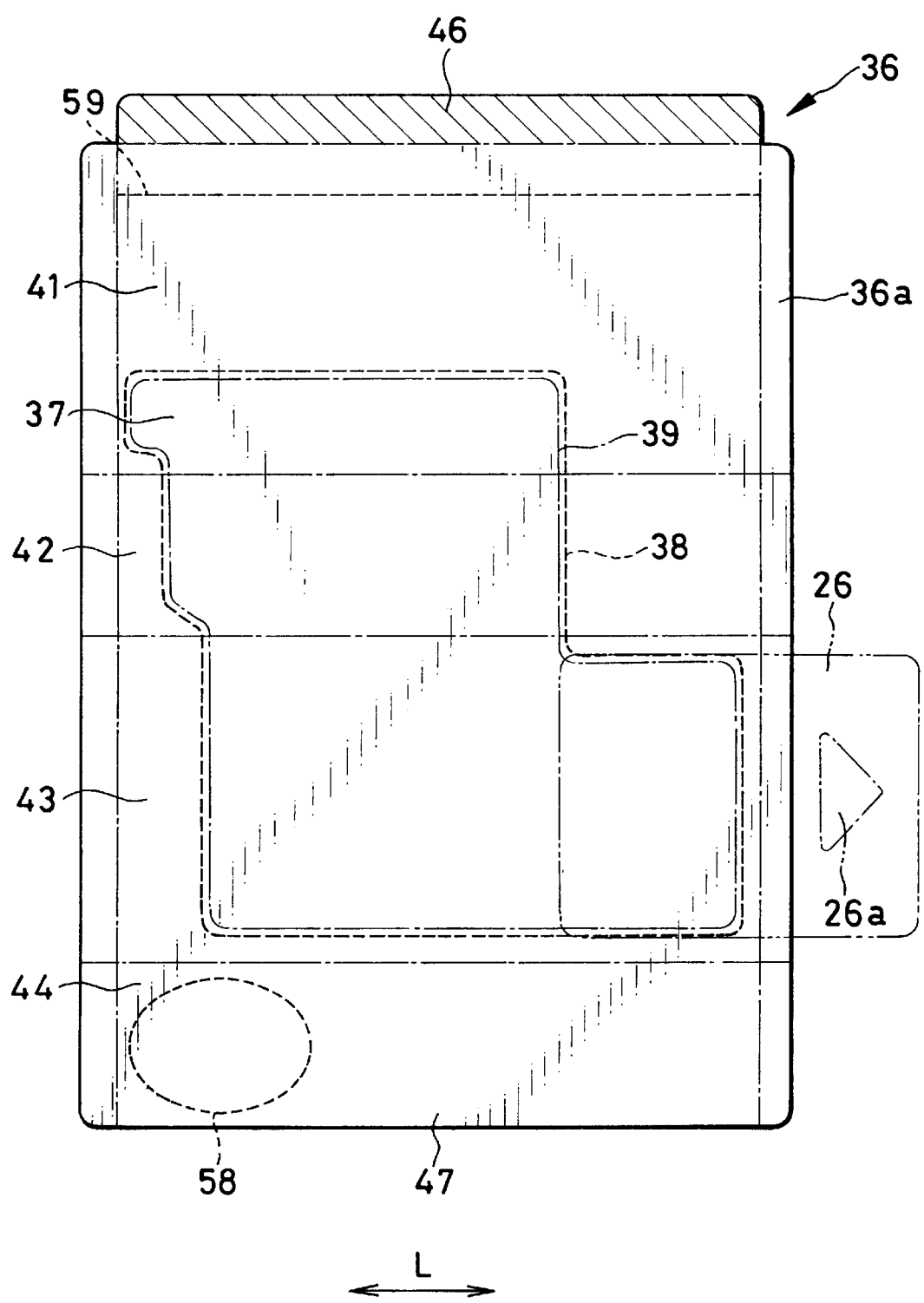
FIG. 6 is an exploded view of the outer sheet, illustrating a position where a hanger is fixed.

As shown in FIG. 6, the outer sheet 36, when exploded, has a nearly rectangular shape. Portions indicated with numbers 41, 42, 43, 44 cover the rear, top, front and bottom faces of the film unit 10, respectively. Half cuts 38 and half cuts 39 are respectively provided on the plastic sheet 31 and the aluminum sheet 32 to construct and form the removable portion 37. The half cuts 39 are disposed in an inner side of the half cuts 38. Accordingly, when the removable portion 37 is removed from the outer sheet 36, a size of the aluminum sheet 32 to be removed is smaller than that of the plastic sheet 31. Further, the outer sheet 36 has a connection portion 46 and a connected area 47 at opposite ends thereof. The connection portion 46 is provided with hatching and an adhesive agent (not shown) is applied thereto. The outer sheet 36 is attached on the film unit 10 by adhering the connection portion 46 to the connected area 47.

Half cuts 58 contacts to a cartridge lid (not shown). When a portion surrounded by the half cuts 58 is peeled off, an exposed photo film is easily unloaded. The film unit 10, after unloading the exposed photo film, is conveyed into a recycling factory, and parts and portions of the film unit 10 are disassembled for recycling or reusing. Before such disassemble, the outer sheet 36 is broken along half cuts 59 and easily peeled off. Further, when a groove for inserting a knife is formed on the film unit 10 under the half cuts 59, the outer sheet 36 will be more easily broken.

The outer sheet 36 is adhered to the film unit 10 with an adhesive agent of a weak adhesive force. When a hot air is blown onto the edge portions 36a, the plastic sheet 31 of the outer sheet 36 shrinks to fixedly stick the outer sheet 36 to the side sheet 35.

Figure 7:
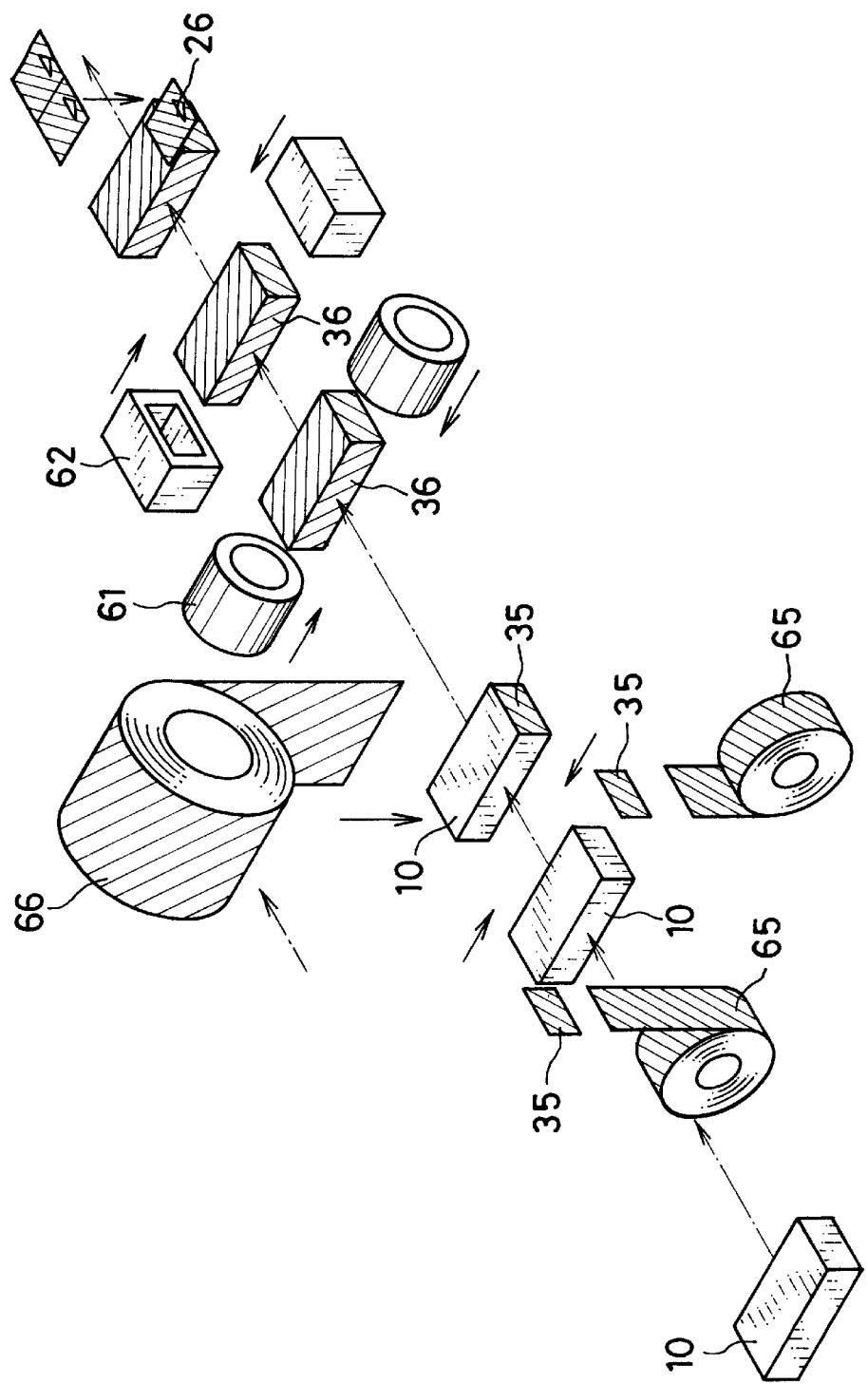
FIG. 7 is an explanatory view illustrating a packaging line for packaging the lens-fitted photo film unit in the package cover.

The process of packaging will be explained, now. As shown in FIG. 7, in a process line for packaging the film unit 10, a side sheet roll 65 and an outer sheet roll 66 are disposed, in which the side sheet 35 and the outer sheet 36 are continuously rolled, respectively. Further, a hot jet 61 for blowing the hot air and a form correcting device 62 for correcting a shape of the outer sheet after shrinking in the hot air are arranged.

Figure 8A:
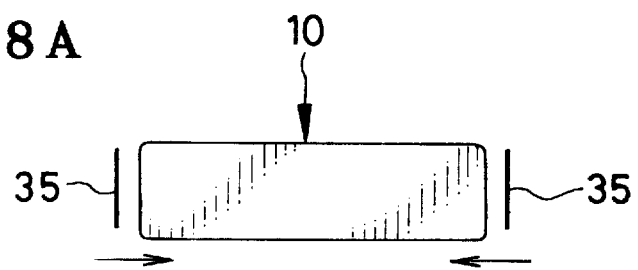
FIGS. 8A–8E are explanatory views illustrating processes of packaging the lens-fitted photo film unit in the present invention.

In FIG. 8A, the side sheet 35 is cut off from the side sheet roll 65 to have a predetermined size, and attached on the side face of the film unit 10 with the adhesive agent of the low viscosity not so as to cover the corner 10a. Note that the side sheet 35 may cover the corner 10a as the corner 10a and the edges of the side sheet 35 are covered with the outer sheet 36.

Figure 8B:
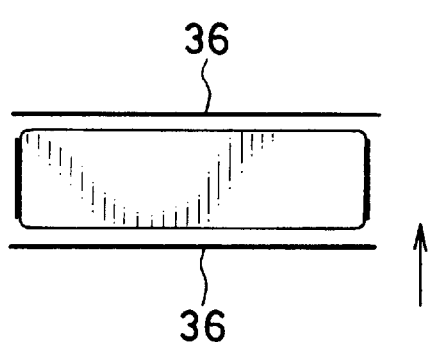

In the next process in FIG. 8B, the outer sheet 36 is cut off from the outer sheet roll 66 at a predetermined size, and attached on the film unit 10 with the adhesive agent of the weak adhesive force so as to cover the front, rear, top and bottom faces. The connection portion 46 of the outer sheet 36 is adhered to the connected area 47.

Figure 8C:
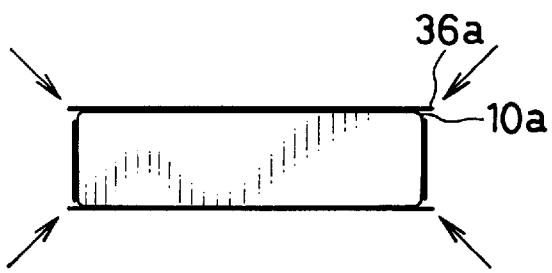

Then, as shown in FIG. 8C, the hot air is blown from the hot jet 61 in directions illustrated with arrows to shrink the edge portions 36a. After shrunken, the edge portions 36a still cover the edges of the side sheets. In the next process, a form of the package cover 25 is corrected by the form correcting device 62.

Figure 8D:
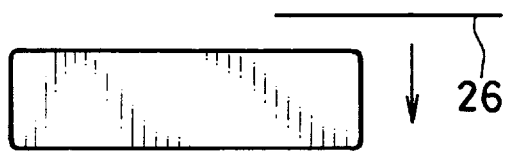
Figure 8E:
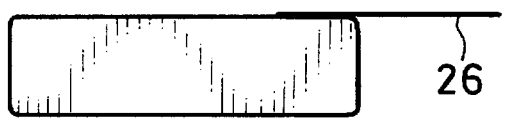

In the next process, a hanger 26 is attached to the package cover 25. As shown in FIG. 8D, a hanger 26 is adhered to the removable portion 37 with the adhesive agent of the strong adhesive force. Then, as shown in the FIG. 8(E), packaging of the film unit 10 is complete, and it is shipped to sailing agents.

The package cover 25 of the film unit 10, after bought at the shop, is opened. When the hanger 26 is pulled with hands, the removable portion 37 is peeled thereby with braking the half cuts 38. Then, parts and portions necessary for photograph and operation appear, such as the taking lens 11, the view finder 12 and the like, so that it may become possible to take a photograph.

After all frames are exposed, the user brings the film unit 10 to the photofinishing laboratory for development of the photo film. In the photofinishing laboratory, a cartridge is unloaded, and development and print are carried out. Parts of the film unit 10, after the photo film is unloaded, are recycled and reused in the recycling factory. When the disassembling the film unit 10, the half cuts 59 are broken and the package cover 25 is peeled off.

According to the invention, the number of the parts and costs for packaging the film unit 10 can be reduced without loosing the moisture-proof property and beauty of appearance. Further, as the removable portion 37 has the smallest size necessary for appearance of the photographic elements and the operation members, the present invention will contrive the environmental protection. The users easily open the package sheet by pulling the hanger 26 attached on the package cover 25.

As the packaging of the film unit is easy in production, the cost for packaging will become lower. Further, the cartridge is easily unloaded from the film unit 10 for development of the photo film, and the package cover 25 will be easily peeled off in recycling process. Accordingly, the workability is improved and the cost is reduced The hanger 26 may be adhered everywhere on the removable portion 37 while it is fixed in a front side thereof in the above embodiment. Further, the outer sheet 36, after the hanger 26 is adhered thereto, may be adhered to the film unit 10. The hanger 26 is also used for peeling the removable portion 37, but others may be formed, for example, a cutting used for opening the package cover 25.

In the above embodiment, the sheet material of the package cover 25 includes an aluminum sheet 32. As it may have a moisture-proof property, a barrier film sheet may be used instead of the aluminum sheet 32. Further, in the embodiment, the one removable portion 37 is formed. There may be also plurality of the removable portions. Fine perforations may be also provided instead of the half cuts 38 used for peeling the removable portion, so far as not to loose the moisture-proof property.

In the above embodiment, the film unit has no projections. But the film unit with projections such as a taking lens can be packaged in the present invention. The outer sheet should have a larger size thereto. After blowing the hot air, the shape of the package cover can be corrected. The side sheet 35 may be constructed of only the aluminum sheet 32. The both side faces of the film unit 10 is covered with the side sheets 35. When the side faces of the film unit 10 is processed to have a moisture-proof property, it is not necessary to adhere the side sheets.

Various changes and modifications are possible in the present invention and may be understood to be within the present invention.

What is claimed is:

1. A package cover for packaging a lens-fitted photo film unit including photographic elements and operation members used for photography, in which a photo film is previously loaded, comprising:
    two side sheets adhered to two side faces of said lens-fitted photo film unit; and
    an outer sheet separate from the side sheets covering front, top, rear and bottom faces of said lens-fitted photo film unit, said outer sheet having edge portions protruding out of said lens-fitted photo film unit in a lengthwise direction of said lens-fitted photo film unit, said edge portions lying on said side sheets.

2. A package cover as described in claim 1, wherein a removable portion is formed in said outer sheet, and said photographic elements and said operation members appear when the removable portion is peeled off.

3. A package cover as described in claim 2, wherein said two side sheets are formed of a sheet material having a moisture-proof property, and said outer sheet is formed of a sheet material having a moisture-proof property and a heat-shrinkable property.

4. A package cover as described in claim 3, wherein a first sheet having the heat-shrinkable property laminates on a second sheet having the moisture-proof property in said sheet material of said outer sheet.

5. A package cover as described in claim 4, wherein said edge portion lacks said second sheet to be constructed of only said first sheet, and is shrunken by a hot air to fixedly stick to said edge.

6. A package cover as described in claim 5, wherein said first sheet is a plastic sheet and said second sheet is an aluminum sheet.

7. A package cover as described in claim 6, wherein a hanger is attached to said removable portion, and said removable portion is peeled off by pulling said hanger.

8. A package cover as described in claim 7, wherein said two side sheets are adhered to said side faces except corners of said lens-fitted photo film unit.

9. A package cover as described in claim 1, wherein said side sheets are separately adhered to opposite side faces of said lens-fitted photo film unit.

10. A packaging method of packaging a lens-fitted photo film unit including photographic elements and operation members used for photographing, in which a photo film is previously loaded, said method comprising steps of:
    adhering first and second side sheets on both side faces of said lens-fitted photo film unit;
    wrapping an outer sheet separate from the side sheets, so as to cover front, top, rear and bottom faces of said lens-fitted photo film unit, said outer sheet having edge portions protruding out of the lens-fitted photo film unit in a lengthwise direction of said lens-fitted photo film unit;
    adhering overlapping ends of said outer cover to one another; and
    blowing a hot air onto said edge portions to fixedly stick them to said side sheets.

11. A packaging method as described in claim 10, wherein a removable portion is formed in said outer sheet, said method further comprising a step of:
    attaching a hanger on said removable portion used for removing said removable portion from said outer sheet.

12. A packaging method as described in claim 11, wherein said side sheets and said outer sheet are formed of a sheet material, and the sheet material being constituted of a plastic sheet having a heat-shrinkable property laminates and an aluminum sheet having a moisture-proof property.

13. A packaging method as described in claim 12, wherein said edge portion lacks said aluminum sheet and consists of said plastic sheet.

14. A packaging method as described in claim 10, wherein said side sheets are separately adhered to opposite side faces of said lens-fitted photo film unit.

15. A package cover for packaging a lens-fitted photo film unit including photographic elements and operation members used for photography, in which a photo film is previously loaded, comprising:
    two side sheets adhered to two side faces of said lens-fitted photo film unit; and
    an outer sheet covering front, top, rear and bottom faces of said lens-fitted photo film unit, said outer sheet having edge portions protruding out of said lens-fitted photo film unit in a lengthwise direction of said lens-fitted photo film unit, said edge portions lying on said side sheets;
    wherein said outer sheet comprises heat-shrinkable material.

* * * * *